US011404177B2

(12) United States Patent
Mariani et al.

(10) Patent No.: US 11,404,177 B2
(45) Date of Patent: Aug. 2, 2022

(54) REACTOR FUEL PELLETS WITH THERMALLY-CONDUCTIVE INSERTS, AND RELATED REACTOR FUEL PELLET ARRANGEMENTS

(71) Applicant: Battelle Energy Alliance, LLC, Idaho Falls, ID (US)

(72) Inventors: Robert D. Mariani, Idaho Falls, ID (US); Pavel G. Medvedev, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 43 days.

(21) Appl. No.: 16/661,398

(22) Filed: Oct. 23, 2019

(65) Prior Publication Data

US 2021/0125735 A1    Apr. 29, 2021

(51) Int. Cl.
  *G21C 3/58*    (2006.01)
  *G21C 3/62*    (2006.01)
  (Continued)

(52) U.S. Cl.
  CPC ............. *G21C 3/58* (2013.01); *G21C 3/045* (2019.01); *G21C 3/048* (2019.01); *G21C 3/07* (2013.01);
  (Continued)

(58) Field of Classification Search
  CPC .......... G21C 3/623; G21C 3/048; G21C 3/07; G21C 3/28; G21C 3/08; G21C 3/58;
  (Continued)

(56) References Cited

U.S. PATENT DOCUMENTS

| 2,941,933 A | * | 6/1960 | Roake | G21C 21/02 |
| | | | | 228/155 |
| 2,986,509 A | * | 5/1961 | Duffy, Jr. | G21C 3/08 |
| | | | | 376/452 |

(Continued)

FOREIGN PATENT DOCUMENTS

| JP | H01318994 A | * | 6/1988 | ............... G21C 3/28 |
| JP | 02293693 A | * | 12/1990 | ............. Y02E 30/40 |

(Continued)

OTHER PUBLICATIONS

Chu, Jennifer (Dec. 21, 2015) "New device uses carbon nanotubes to snag molecules", MIT News, downloaded on Jul. 17, 2021 from URL: https://news.mit.edu/2015/carbon-nanotubes-detect-rare-proteins-viruses-1221 (hereinafter "Chu") (Year: 2015).*

(Continued)

*Primary Examiner* — Darlene M Ritchie
(74) *Attorney, Agent, or Firm* — TraskBritt

(57) ABSTRACT

Fuel pellets and fuel pellet arrangements include thermally-conductive inserts within a fuel. The inserts have at least one portion of a thermally-conductive material, such as radially-extending fins. The inserts are configured to dissipate heat during use of the fuel pellets, while minimizing the amount of the total volume of the fuel pellet that is occupied by non-fissile material. The inclusion of heat-dissipating inserts enables the fuel pellets to exhibit improved thermal performance over the lifetime of the fuel, including a relatively low peak temperature and relatively low integrated average temperatures, while the minimal volume of the inserts avoids significantly decreasing the percent of enrichment achievable.

19 Claims, 14 Drawing Sheets
(4 of 14 Drawing Sheet(s) Filed in Color)

(51) Int. Cl.
*G21C 3/04* (2006.01)
*G21C 3/07* (2006.01)
*G21C 3/28* (2006.01)
*G21C 3/08* (2006.01)

(52) U.S. Cl.
CPC .................. *G21C 3/08* (2013.01); *G21C 3/28* (2013.01); *G21C 3/623* (2013.01)

(58) Field of Classification Search
CPC ... G21C 3/20; G21C 3/18; G21C 3/16; G21C 3/045; G21C 3/06; G21C 21/02; G21C 19/44
USPC ....... 376/260, 354, 362, 414, 412, 424, 425, 376/426, 433, 434, 431, 453–455
See application file for complete search history.

(56) References Cited

U.S. PATENT DOCUMENTS

| | | | | | |
|---|---|---|---|---|---|
| 3,125,493 | A | * | 3/1964 | D'Amore | G21C 3/18 376/420 |
| 3,309,283 | A | * | 3/1967 | Charrault | G21C 3/20 376/424 |
| 3,407,116 | A | * | 10/1968 | Clough | G21C 3/20 376/425 |
| 3,580,809 | A | * | 5/1971 | Williams | G21C 3/17 376/412 |
| 4,036,691 | A | * | 7/1977 | Meadowcroft | G21C 3/17 376/418 |
| 4,678,629 | A | * | 7/1987 | Popa | G21C 3/18 376/419 |
| 4,879,093 | A | | 11/1989 | Garde | |
| 5,112,571 | A | * | 5/1992 | Orii | G21C 3/322 376/439 |
| 5,309,493 | A | * | 5/1994 | Kamimura | G21C 3/326 376/431 |
| 5,932,930 | A | | 8/1999 | Wadekamper et al. | |
| 6,002,735 | A | * | 12/1999 | Van Swam | G21C 3/58 376/435 |
| 6,697,450 | B2 | | 2/2004 | Vaidyanathan et al. | |
| 7,666,470 | B1 | | 2/2010 | McCoy | |
| 8,116,423 | B2 | * | 2/2012 | Bashkirtsev | G21C 5/18 376/412 |
| 8,293,151 | B2 | | 10/2012 | Lahoda et al. | |
| 9,666,310 | B1 | | 5/2017 | Mariani | |
| 10,170,207 | B2 | * | 1/2019 | Bashkirtsev | G21C 3/326 |
| 2010/0054389 | A1 | | 3/2010 | Fetterman | |
| 2011/0222643 | A1 | | 9/2011 | Doudoux et al. | |
| 2011/0240911 | A1 | | 10/2011 | Sundberg et al. | |
| 2012/0183116 | A1 | * | 7/2012 | Hollenbach | G21C 3/623 376/409 |
| 2014/0185730 | A1 | * | 7/2014 | Kim | G21C 21/02 376/412 |
| 2016/0372215 | A1 | * | 12/2016 | Kim | G21C 3/04 |
| 2017/0062080 | A1 | * | 3/2017 | Cheatham, III | G21D 3/001 |
| 2020/0027577 | A1 | * | 1/2020 | Cheatham, III | G21C 3/16 |
| 2020/0027602 | A1 | * | 1/2020 | Kim | G21C 3/045 |
| 2020/0365284 | A1 | * | 11/2020 | Hackett | C22C 38/28 |

FOREIGN PATENT DOCUMENTS

| | | | | |
|---|---|---|---|---|
| JP | 2556876 | B2 * | 11/1996 | Y02E 30/30 |
| RU | 2419897 | C1 * | 5/2011 | Y02E 30/30 |

OTHER PUBLICATIONS

Caillet, M., et al. "Preparation and oxidation of zirconium silicide coatings on zirconium." Materials and coatings to resist high temperature corrosion. 1978. Abstract: <https://inis.iaea.org/search/search.aspx?orig_q=RN:10440627>.

Chao, T. L., et al. Potential of duplex fuel in prebreeder, breeder, and power reactor designs: tests and analyses (AWBA Development Program). No. WAPD-TM-1512. Bettis Atomic Power Lab., Pittsburgh, PA (USA), 1982. Available online: <http://www.osti.gov/scitech/servlets/purl/6762496>.

Jo, Chang Keun, Nam Zin Cho, and Yong Hee Kim. "Graphite-filled mixed-oxide fuel design for fully loaded PWR cores." Annals of Nuclear Energy 27.9 (2000): 819-829. Abstract. Available online: <http://www.sciencedirect.com/science/article/pii/S0306454900000049#>.

Kutty, TR Govindan, Joydipta Banerjee, and Arun Kumar. "Thermophysical Properties of Thoria-based Fuels." Thoria-based Nuclear Fuels. Springer London, 2013. 11-70. Abstract. (full version available online: <http://link.springer.com/chapter/10.1007/978-1-4471-5589-8 2>.).

MacDonald, R. D. Irradiation performance of zircaloy sheathed fuel elements with metallic or ceramic discs between UO_2 pellets. Atomic Energy of Canada Ltd., Chalk River, Ontario. Chalk River Nuclear Labs, 1970. Text version available online: <https://inis.iaea.org/search/search.aspx?orig_q=RN:1003865>.

Yang, Yong-Sik, et al. "Thermomechanical analysis and irradiation test of sintered dual-cooled annular fuel." Nuclear Technology 178.3 (2012): 267-279. Abstract, (full version Available online: <http://www.ans.org/pubs/journals/nt/a_13593>.).

Yang, Yong-Sik, et al. "Thermomechanical analysis and irradiation test of sintered dual-cooled annular fuel." Nuclear Technology 178.3 (2012): 267-279. Full version.

Jo, Chang Keun, Nam Zin Cho, and Yong Hee Kim. "Graphite-filled mixed-oxide fuel design for fully loaded PWR cores." Annals of Nuclear Energy 27 (2000): 819-829. Full version.

Sears et al., "Development of LEU Fuel to Convert Research Reactors: NRU, Maple and Slowpoke," International Symposium on Minimization of Highly Enriched Uranium in the Civilian Nuclear Sector, Atomic Energy of Canada Limited (AECL), Fuel Development Branch, (2006), 12 pages.

White et al. "Irradiation Behavior of Dispersion Fuels," General Electric Company, (1957), 59 pages.

* cited by examiner

REACTOR FUEL PELLETS WITH THERMALLY-CONDUCTIVE INSERTS, AND RELATED REACTOR FUEL PELLET ARRANGEMENTS

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

This disclosure, in various embodiments, relates generally to reactor fuel pellets and to reactor fuel pellet arrangements. More particularly, this disclosure relates to reactor fuel pellets and arrangements comprising thermally-conductive inserts.

BACKGROUND

Improving the safety and efficiency of the operation of reactors continues to be of great interest. Of particular interest is the development of fuels that are configured or formulated to maintain stability in the event of a loss of coolant.

Previous efforts have been made to design reactor fuel pellets and reactor fuel pellet arrangements (e.g., for Light Water reactor (LWR) operations) that exhibit lower peak temperatures at peak operating power, compared to preceding designs. These previous efforts include designing reactor fuel pellets as annular structures, e.g., with hollow cores, to reduce the length of a heat conduction path. Additional efforts to further improve upon the annular design have included filling the center of the annulus (e.g., the otherwise-hollow area along the central axis of the pellet) with a thermally-conductive structure (e.g., a rod, a hollow tube) while disposing additional thermally-conductive structures on the ends of the pellet structure. While these prior designs have exhibited improvements over their predecessors, the space (e.g., volume(s)) occupied by the hollow core or the thermally-conductive structures occupy space that could have otherwise been occupied by fuel material. Therefore, with these designs, fissile material enrichment (e.g., U-235 enrichment) may have to be substantially increased to account for the displaced volume of fuel.

In addition to the foregoing, other challenges are presented for fuel pellet design. These other challenges include avoiding swelling of the fuel itself and avoiding degradation of the thermal conductivity, and therefore the thermal performance, of the fuel due to fission gases releasing, during operation, and mixing with helium gas originally charged to the fuel during fabrication.

Accordingly, designing reactor fuels and arrangements that exhibit sufficient or improved thermal performance over the lifetime of the fuel without substantially increasing the needed percentage of enrichment remains challenging.

BRIEF SUMMARY

Various embodiments of the disclosure provide reactor fuel pellets and arrangements that include thermally-conductive inserts that help dissipate heat from the fuel, while the inserts occupy less volume of the pellet structure and less volume of pellet arrangements (e.g., compared to conventional designs). Therefore, the pellets and arrangements effectively lower the peak temperature (e.g., the temperature of the fuel at peak operating power) and effectively lower the integrated average temperature (e.g., the average temperature of volume segments of the fuel during operation), compared to peak and integrated average temperatures of conventional designs, without significantly increasing the percentage of enrichment (e.g., U-235 enrichment) necessary to maintain desired operation levels (e.g., power production).

In some embodiments, a fuel pellet for a reactor comprises an insert extending within a fuel. The insert comprises at least one portion comprising a thermally-conductive material. The insert occupies less than about 10 vol. % of the fuel pellet.

In some embodiments, a fuel pellet arrangement comprises a stack of fuel pellets. At least one of the fuel pellets comprises a thermally-conductive insert within a fuel. The thermally-conductive insert comprises at least one portion defining a thickness of less than about 0.5 mm.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 11A through FIG. 11H illustrate a variety of fuel pellet designs, showing a one-fourth segment of each in cross-section for ease of illustration, wherein:

FIG. 11A illustrates a conventional monolithic, solid cylindrical structure of fuel without an insert and without discs;

FIG. 11B illustrates a fuel pellet, according to embodiments of the disclosure, with an insert having an annular portion, surrounded and filled with a fuel, and further including discs;

FIG. 11C illustrates a fuel pellet, according to embodiments of the disclosure, with an insert having a star-shaped tubular portion, surrounded and filled with a fuel, and further including discs;

FIG. 11D illustrates a fuel pellet, according to embodiments of the disclosure, with an insert having an annular portion and fins extending therefrom, fuel filling the annular portion and surrounding the annular portion and the fins, and without discs;

FIG. 11E illustrates a fuel pellet, according to embodiments of the disclosure, with an insert like that of FIG. 11D but further including discs;

FIG. 11F illustrates a fuel pellet, according to embodiments of the disclosure, with an insert having long fins extending directly from a central axis of the fuel pellet, and without discs;

FIG. 11G illustrates a fuel pellet, according to embodiments of the disclosure, with an insert having long fins extending from an annular portion that is filled with a fuel, the fuel also surrounding the fins and annular portion, and without discs; and FIG. 11H illustrates a fuel pellet, according to embodiments of the disclosure, with an insert having fins extending perpendicularly to a central axis and with the fuel interleaved with the fins, forming a sandwich structure.

DETAILED DESCRIPTION

Figure 1:
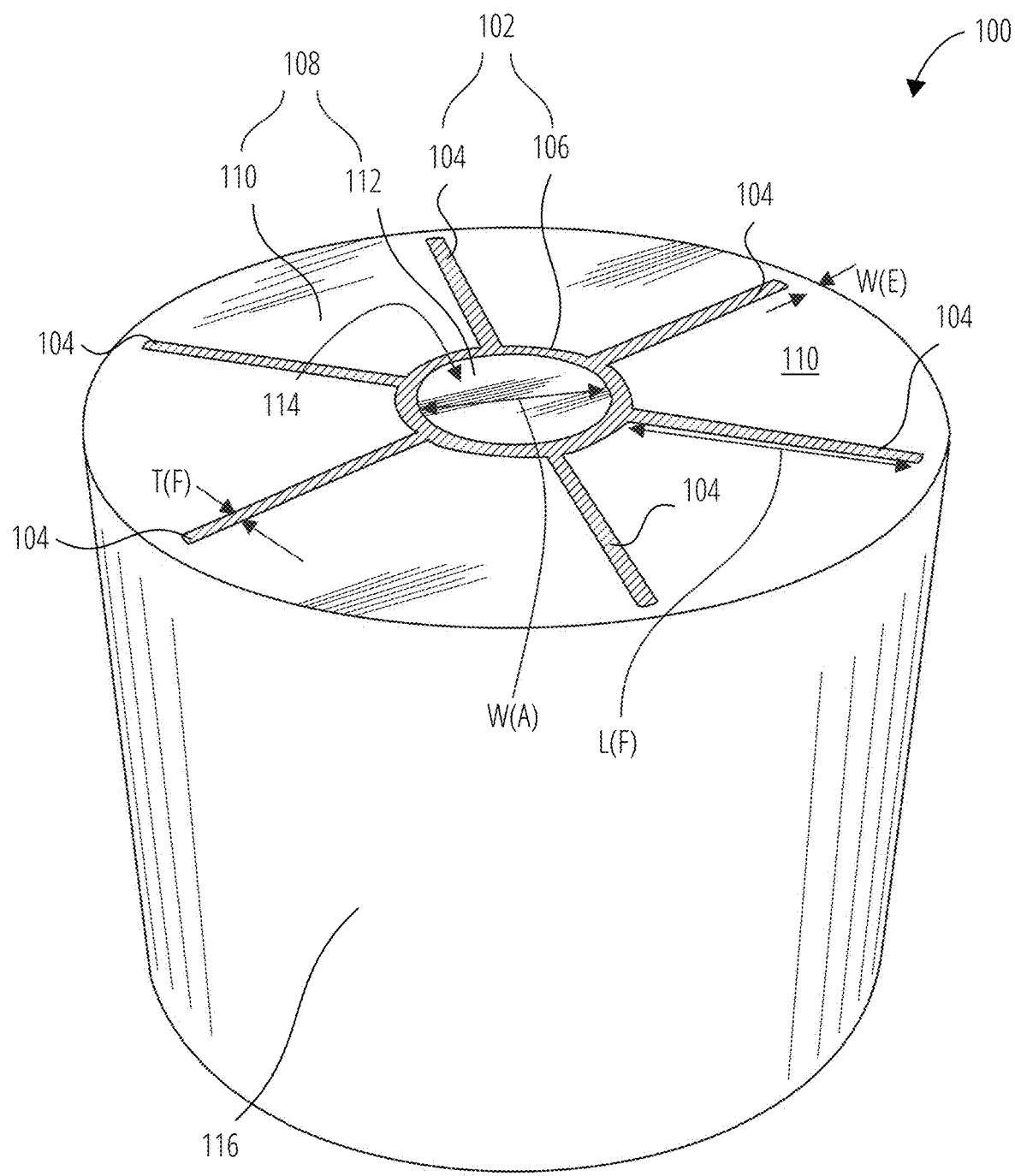
FIG. 1 is a front and top perspective illustration of a fuel pellet, according to embodiments of the disclosure, wherein the fuel pellet includes a thermally-conductive insert having six fins extending from an annular portion.

Disclosed are fuel pellets and fuel pellet arrangements that include thermally-conductive inserts that occupy a minimal volume of the total volume of the fuel pellets and fuel pellet arrangements. The inclusion of the inserts enables the fuel pellets to exhibit improved thermal performance (e.g., improved thermal conductivity) over the life of the fuel. For example, the inserts enable the fuel of the fuel pellets to exhibit lower peak temperatures and lower integrated average temperatures, compared to conventional fuel pellets, over the life of the fuel (e.g., during all stages of use of the fuel) without substantially increasing the percentage of enrichment (e.g., U-235 enrichment) sufficient to offset the effective displaced volume of fuel from the inclusion of the insert. With lower temperatures, the fuel pellets and fuel pellet arrangements may improve the margin for safe operation of reactors using the pellets and/or arrangements. For example, the disclosed fuel pellets and arrangements may experience less degradation in the event of a sudden (e.g., unexpected) increase in power load during operation; thus, again, the thermal performance of the fuel of the pellets and arrangements may be improved. Also, with lower temperatures, fission gas (e.g., fission product gases) may be retained moreso than with conventional pellets or arrangements at higher temperatures. With the retention of fission gases, the fuel of the pellets and arrangements may be less prone to thermal conductivity degradation during operation. For any or all of these reasons, the fuel pellets and arrangements may exhibit improved thermal performance over the lifetime of the fuel, as compared to conventional pellets and arrangements, without requiring a substantial increase in enrichment percentage because the displaced volume of fuel, due to the inclusion of the insert(s), is minimal.

As used herein, the terms "horizontal" or "lateral," when describing a feature illustrated in a figure, mean and include a direction that is parallel to the width of the sheet including the referenced figure.

As used herein, the terms "vertical" or "longitudinal," when describing a feature illustrated in a figure, mean and include a direction that is parallel to the length of the sheet including the referenced figure.

As used herein, the terms "thickness" or "thinness" mean and include a dimension in a straight-line direction that is normal to the closest surface of an immediately adjacent material or structure that is of a different composition or that is otherwise distinguishable from the material or structure whose thickness, thinness, or height is discussed.

As used herein, the term "between" is a spatially relative term used to describe the relative disposition of one material, structure, or component relative to at least two other materials, structures, or components. The term "between" may encompass both a disposition of one material, structure, or component directly adjacent the other materials, structures, or components and a disposition of one material, structure, or component indirectly adjacent the other materials, structures, or components.

As used herein, the term "proximate" is a spatially relative term used to describe disposition of one material, structure, or component near to another material, structure, or component. The term "proximate" includes dispositions of indirectly adjacent to, directly adjacent to, and internal to.

As used herein, the term "neighboring," when referring to a material, structure, or component, means and refers to a next, most proximate material, structure, or component of an identified composition, structure, or other characteristic. Materials, structures, or components of other compositions or characteristics than the identified composition, structure, or other characteristic may be disposed between one material, structure, or component and its "neighboring" material, structure, or component of the identified composition, structure, or other characteristic. For example, a structure of material X "neighboring" a structure of material Y is the first material X structure, e.g., of multiple material X structures, that is next most proximate to the particular structure of material Y. The "neighboring" material, structure, or component may be directly or indirectly proximate the material, structure, or component of the identified composition, structure, or other characteristic.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially," when referring to a parameter, property, or condition, means and includes the parameter, property, or condition being equal to or within a degree of variance from a given value such that one of ordinary skill in the art would understand such given value to be acceptably met, such as within acceptable manufacturing tolerances. By way of example, depending on the particular parameter, property, or condition that is substantially met, the parameter, property, or condition may be "substantially" a given value when the value is at least 90.0% met, at least 95.0% met, at least 99.0% met, or even at least 99.9% met.

As used herein, reference to an element as being "on" or "over" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, there are no intervening elements present.

As used herein, other spatially relative terms, such as "below," "lower," "bottom," "above," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation as depicted in the figures. For example, if materials in the figures are inverted, elements described as "below" or "under" or "on bottom of" other elements or features would then be oriented "above" or "on top of" the other elements or features. Thus, the term "below" may encompass both an orientation of above and below, depending on the context in which the term is used, which will be evident to one of ordinary skill in the art. The materials may be otherwise oriented (rotated ninety degrees, inverted, etc.) and the spatially relative descriptors used herein interpreted accordingly.

As used herein, the terms "comprises," "comprising," "includes," and/or "including" specify the presence of stated features, structures, elements, materials, components, and/or arrangements, but do not preclude the presence or addition of one or more other features, structures, elements, materials, components, and/or arrangements thereof.

As used herein, "and/or" includes any and all combinations of one or more of the associated listed items.

As used herein, the singular forms "a," "an," and "the" are intended to include the plural forms as well, unless the context clearly indicates otherwise.

As used herein, the terms "configured" and "configuration" mean and refer to a size, shape, material composition, orientation, and arrangement of a referenced material, structure, arrangement, or apparatus so as to facilitate a referenced operation or property of the referenced material, structure, arrangement, or apparatus in a predetermined way.

The illustrations presented herein are not meant to be actual views of any particular material, structure, component, or arrangement, but are merely idealized representations that are employed to describe embodiments of the disclosure.

Embodiments are described herein with reference to cross-sectional illustrations that are schematic illustrations. Accordingly, variations from the shapes of the illustrations as a result, for example, of manufacturing techniques and/or tolerances, are to be expected. Variations from the illustrated shapes may also result, for example, from use of the illustrated structures or arrangements in operations. Thus, the illustrated structures and arrangements may represent such structures and arrangements at least prior to use, if not also during or after some or all use. The embodiments described herein are not to be construed as limited to the particular shapes or structures as illustrated but may include deviations in shapes that result, for example, from manufacturing techniques or the effects of use in operations (e.g., U-235 enrichment). For example, a structure illustrated or described as box-shaped may have rough and/or nonlinear features when initially formed, during use, or after some or all use. Moreover, sharp angles that are illustrated may be rounded when initially formed, during use, or after some or all use. Thus, the materials, features, structures, and arrangements illustrated in the figures are schematic in nature and their shapes are not intended to illustrate the precise shape of a material, feature, structure, or arrangement and do not limit the scope of the present claims.

The following description provides specific details, such as material types and fin arrangements, in order to provide a thorough description of embodiments of the disclosed apparatus (e.g., fuel pellets and fuel arrangements). However, a person of ordinary skill in the art will understand that the embodiments of the apparatus may be practiced without employing these specific details.

Reference will now be made to the drawings, where like numerals refer to like components throughout. The drawings are not necessarily drawn to scale.

FIG. 1 illustrates a fuel pellet 100 that includes an insert 102 within fuel 108. The insert 102 is formed of a thermally-conductive material. The thermally-conductive material is substantially more thermally conductive than the fuel 108 itself, at least when the fuel pellet 100 is initially fabricated. Moreover, during use, the fuel 108 may become less thermally conductive, such that, over time with use of the fuel pellet 100, the insert 102 (e.g., the thermally-conductive material thereof) may become even more thermally conductive in comparison to the fuel 108.

The thermally-conductive material of the fuel 108 comprises a material that exhibits sufficient thermal conductivity over the lifetime of the fuel 108. In some embodiments, the thermally-conductive material of the fuel 108 may exhibit a room-temperature, unirradiated, thermal conductivity greater than ten Watts per meter per Kelvin (greater than 10 W/m-K). For example, the thermally-conductive material of the fuel 108 may be formulated to have no or negligible chemical reaction with the material of the fuel 108 itself, with fission products, with cladding, or with other materials of the fuel pellet 100 or the reactor(s) in which it is used. For example, the thermally-conductive material of the insert 102 may comprise, consist essentially of, or consist of one or more of silicon (Si), zirconium (Zr) (e.g., alloys of zirconium), aluminum oxide ($Al_2O_3$), niobium (Nb) (e.g., alloys of niobium), molybdenum (Mo) (e.g., alloys of molybdenum), chromium (Cr), uranium (U) (e.g., alloys of uranium), carbon (C) (e.g., graphite, diamond), and iron (Fe) (e.g., alloys of iron, such as steels).

In some embodiments, the thermally-conductive material of the insert 102 may consist essentially of or consist of non-fissile material. In other embodiments, the thermally-conductive material may comprise, consist essentially of, or consist of fissile material, such as a fissile uranium material with a low uranium content that behaves well toward swelling and fission gas retention, provided that such material does not significantly compromise peak and integrated average temperatures compared to use of a non-fissile material, such as niobium (Nb) or any of the other example materials discussed in the previous paragraph.

The insert includes portions of the thermally-conductive material, and each portion may define a thickness of the thermally-conductive material that is relatively thin, e.g., less than about 0.5 mm in thickness. The portions may include planar structures (e.g., "fins") extending radially within the fuel 108. Each fin may define the thickness of less than about 0.5 mm. Additionally or alternatively, the portions may include one or more rod-like or annular portions at or about the central axis of the fuel pellet. The multiple portions of the thermally-conductive material may be directly connected to one another, forming a singular structure; or, in other embodiments, one or more of the portions may be separated from the others by, e.g., a portion of the fuel 108, such that the insert includes multiple discrete segments.

With regard to the fuel pellet 100 of FIG. 1, the insert 102 of FIG. 1 includes plurality of (e.g., six) fins 104 extending radially relative to a central axis of the fuel pellet 100. The fins 104 of FIG. 1 extend from an annular portion 106 (e.g., a "tube") centered on the central axis of the fuel pellet 100. Various dimensions of the insert 102 may be tailored to optimize dissipation of heat during use of the fuel pellet 100 while minimizing the volume percentage of the fuel pellet 100 that is occupied by the insert 102. For example, a length L(F) of each of the fins 104, a thickness T(F) of each of the fins 104, a thickness of the annular portion 106, a width (e.g., diameter) W(A) of the annular portion 106, and a distance W(E) from which a terminal edge of each of the fins 104 is offset from an outer edge (e.g., horizontal periphery) of the fuel pellet 100 may all be tailored. In some embodiments, the volume percentage of the fuel pellet 100 occupied by the insert 102 may be less than about 10% (e.g., less than about 7.5%).

The fuel pellet 100 also includes fuel 108 adjacent (e.g., directly adjacent) the insert 102. The fuel 108 comprises, consists essentially of, or consists of a fissile material, such as uranium-based fissile material (e.g., $UO_2$; UN; UC; uranium alloys, such as U-10Zr, U-10Pu-U10Zr, and/or U-10Mo, wherein the number indicates weight percentages of the succeeding element), plutonium-based fissile material (e.g., $PuO_2$, PuN, PuC), mixed fuels (e.g., $UO_2$—$PuO_2$), thorium-based fissile material. Therefore, the fuel 108 may comprise, consist essentially of, or consist of one or more of uranium, plutonium, and/or thorium.

The fuel 108 of FIG. 1 includes an outer fuel portion 110 filling the volume between the fins 104 and includes a central rod 112 filling a central portion 114 of the annular portion 106 of the insert 102. Thus, of the total volume of the fuel pellet 100, the volume not occupied by the insert 102 is otherwise occupied by the fuel 108. Accordingly, while the insert 102 may occupy as little as 1 vol. % of the fuel pellet 100, the fuel 108 may occupy up to about 99 vol. % of the fuel pellet 100.

In some embodiments, the fins 104 of the insert 102 may not extend to the periphery of the fuel pellet 100; therefore, the fuel 108 (e.g., the outer fuel portion 110) may define an outer surface (e.g., sidewall 116) that is continuous (e.g., wholly formed by the fuel 108 without defining discrete, separated segments of the fuel 108).

The illustrated design for the fuel pellet 100 enables sufficient dissipation of heat during use of the fuel pellet 100, enabling a lower peak temperature during peak power and a lower integrated average temperature over the life of the fuel pellet 100, while minimizing the volume of fuel 108 effectively displaced by the inclusion of the insert 102, enabling maximized volume of the fuel 108 within the fuel pellet 100. In some embodiments, the volume of the fuel 108, relative to the total volume of the fuel pellet 100, may be as great as 99%.

Notably, for the fuel pellet 100 of FIG. 1, including the fuel 108 to fill the annular portion 106 of the insert 102, the fuel 108 is provided in a greater volume percentage of the fuel pellet 100 than, e.g., if the annular portion 106 were not filled with the fuel 108. In this or other fuel pellet configurations of embodiments of the disclosure, the greater the volume percentage of the fuel pellet occupied by the fuel (e.g., fuel 108), the greater the effect of the achievable enrichment percentage (e.g., the U-235 enrichment percentage) may be. Therefore, the enrichment percentage increase to compensate for any losses due to the displacement of fuel 108 reactivity volume by the insert 102 may be tailored (e.g., minimized) by maximizing the fuel's volume percentage of the fuel pellet.

Moreover, in the fuel pellet 100, the fuel 108 occupies a greater volume percentage, compared to that occupied by fuel of a conventional fuel pellet using an annular structure for its fuel with its central portion filled with a thermally-conductive (and non-fissile material) material. While such conventional fuel pellet reportedly needs approximately 7.5% U-235 enrichment to account for its loss of reactivity volume (e.g., due to the monolithic rod of thermally-conductive material), the design for the fuel pellet 100 of FIG. 1 does not necessitate such a significant increase in the enrichment percentage.

The structure of the fuel pellet 100 may also enable achieving a significantly high percentage of enrichment (e.g., U-235 enrichment). For example, using the fuel pellet 100, one may achieve a 19.75% U-235 enrichment or thereabouts. Such high enrichment percentages may enable use of the fuel pellet 100 in compact, deployable, diversion-resistant fuel systems; in portable systems (e.g., on trucks or other means of transport) that can support power grids affected by harsh conditions, such as tornadoes, hurricanes, etc.; in other small-scale operations, such as in providing power to hospitals, or for drinking water production.

Figure 2:
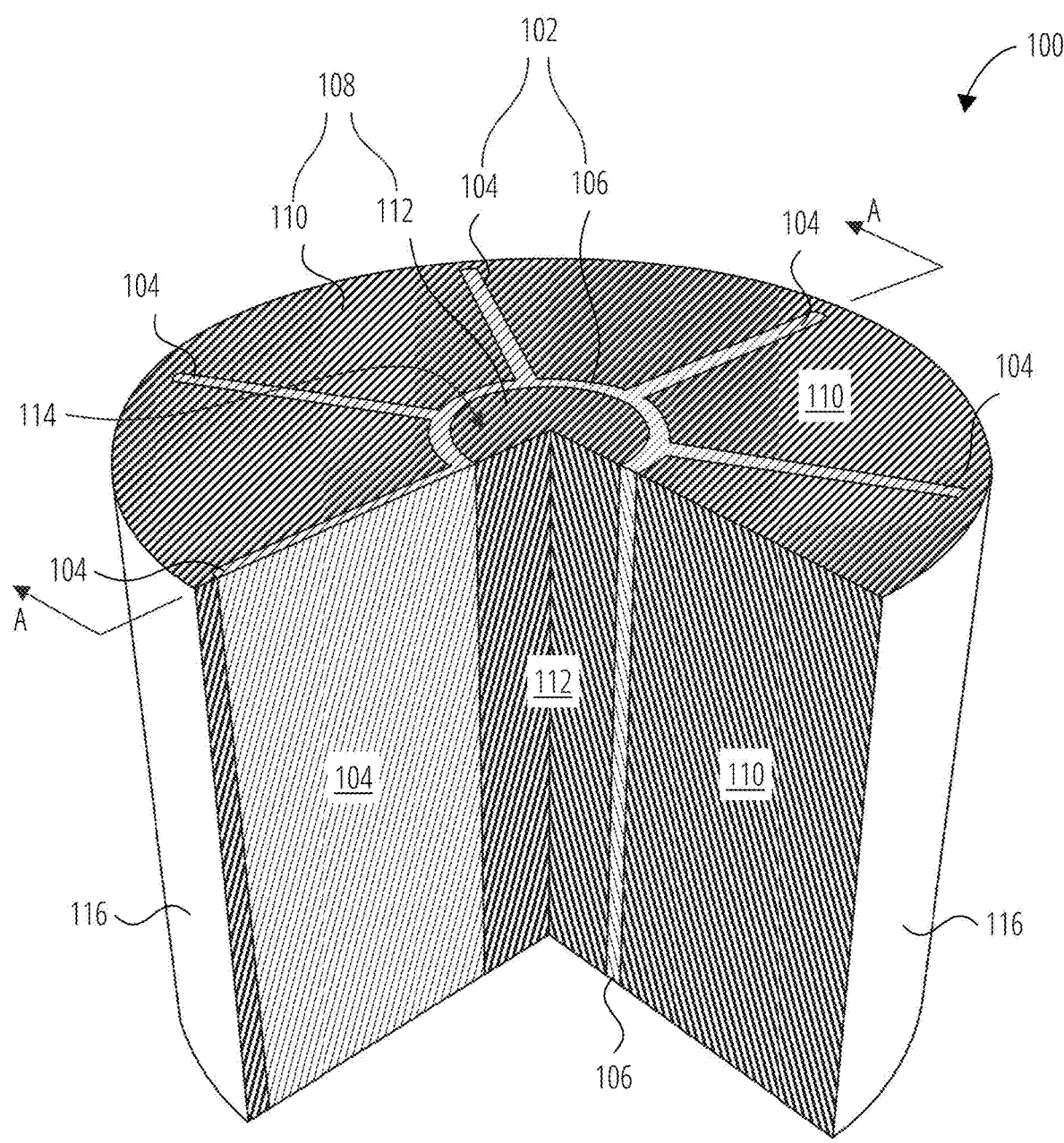
FIG. 2 is a front and top perspective, cut-away illustration of the fuel pellet of FIG. 1.

With reference to FIG. 2, the fuel pellet 100 of FIG. 1 is illustrated with a quadrant removed for illustration purposes. From this view, it can be seen that each of the fins 104 may be substantially planar, extending a height of the fuel pellet 100. The fins 104 are exposed at both of an upper and a lower surface of the fuel pellet 100, which may promote dissipation of heat during use of the fuel pellet 100 and, therefore, enable a lower peak temperature.

Figure 3:
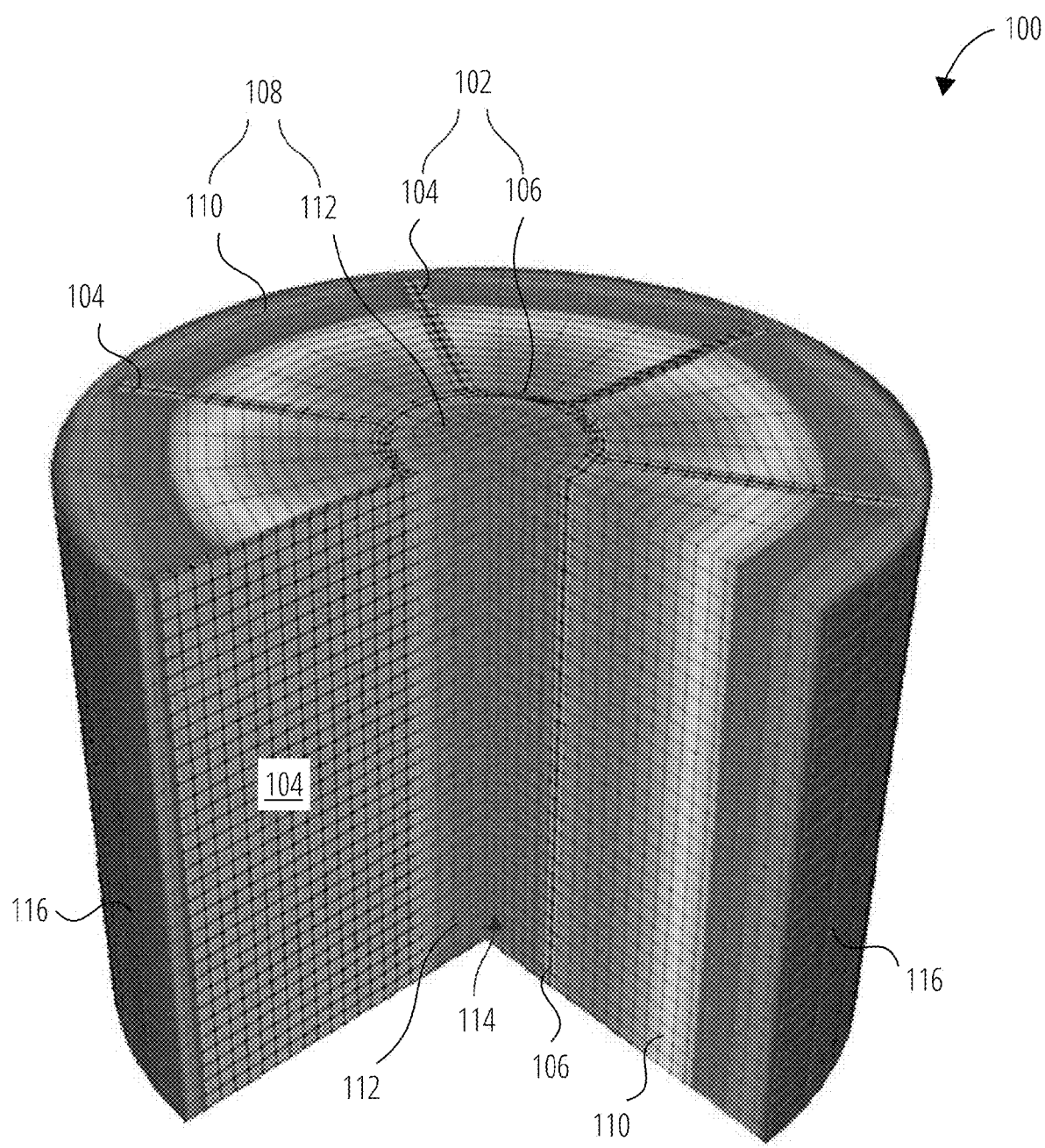
FIG. 3 is a temperature contour for the fuel pellet of FIG. 1.

FIG. 3 is a temperature color contour illustration of the fuel pellet 100, depicting the distribution of heat across a width and height of the fuel pellet 100. The numbers included in the color key are in units of degrees Celsius. Therefore, the maximum temperature in the color key is 1170° C., and the minimum temperature in the color key is 522.0° C.

The structure of the fuel pellet 100 of FIG. 1 through FIG. 3 may effectively dissipate heat, and therefore sufficiently lower both integrated average temperature and peak temperature, even if used without additional heat-dissipating structures, such as thermally-conductive discs, as in aforementioned conventional structures. Even so, the fuel pellet 100 may alternatively be used in conjunction with such structures.

Figure 4:
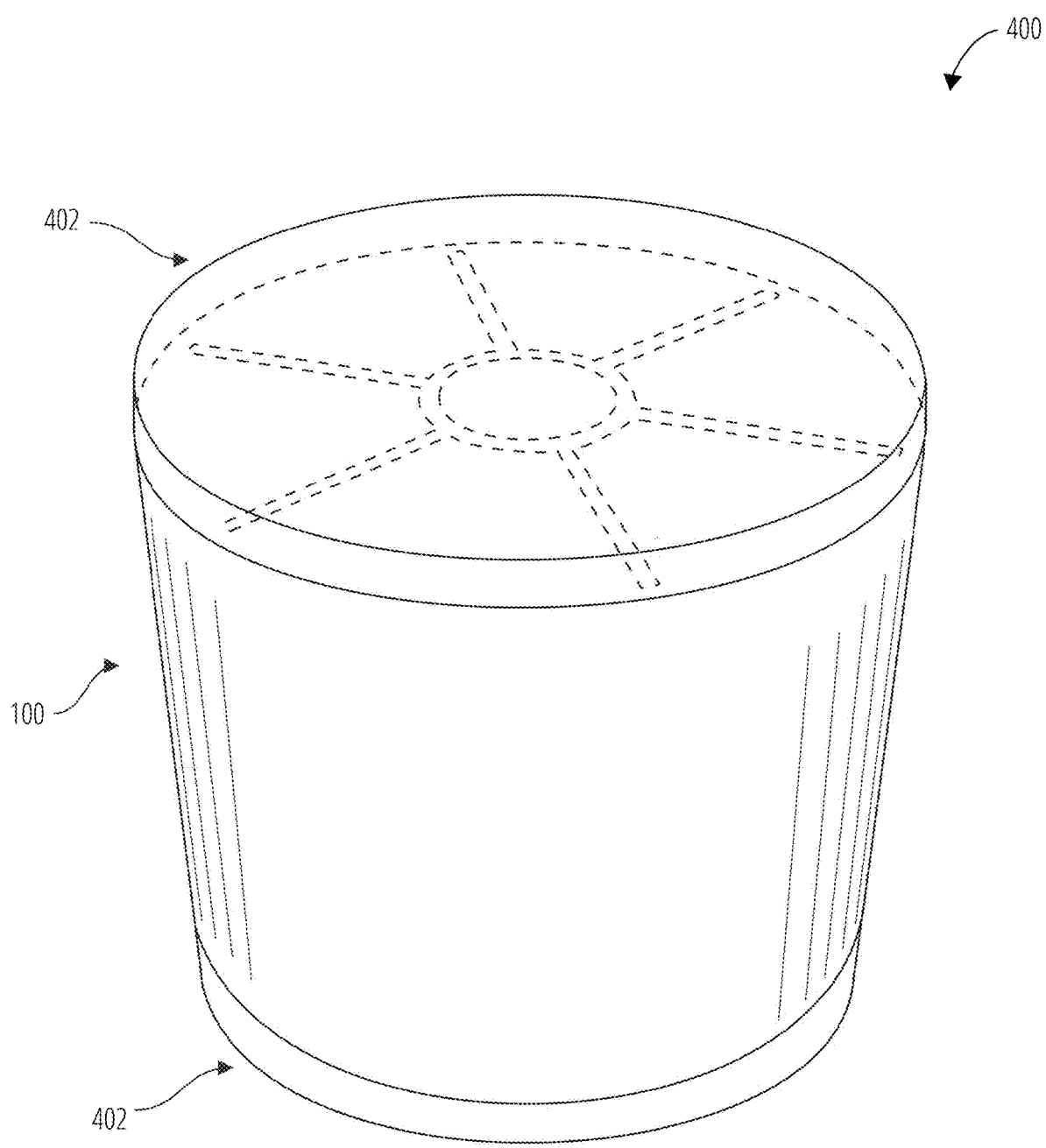
FIG. 4 is a front and top perspective illustration of a fuel pellet arrangement, according to embodiments of the disclosure, wherein the arrangement includes the fuel pellet of FIG. 1 and thermally-conductive discs.

For example, as illustrated in FIG. 4, a fuel arrangement 400 may include the fuel pellet 100 between a pair of discs 402 in physical contact with a surface of the insert 102 of the fuel pellet 100. Each of the discs 402 may comprise, consist essentially of, or consist of one or more of the thermally-conductive materials described above. The thermally-conductive material of the discs 402 may be the same (e.g., have the same chemical composition) as that of the insert 102. In other embodiments, the thermally-conductive materials of the discs 402 and the insert 102 may be of different chemical compositions.

In embodiments utilizing discs 402 in the fuel arrangement 400, the discs 402 may further dissipate heat during use of the fuel pellet 100 and the fuel arrangement 400.

Figure 5:
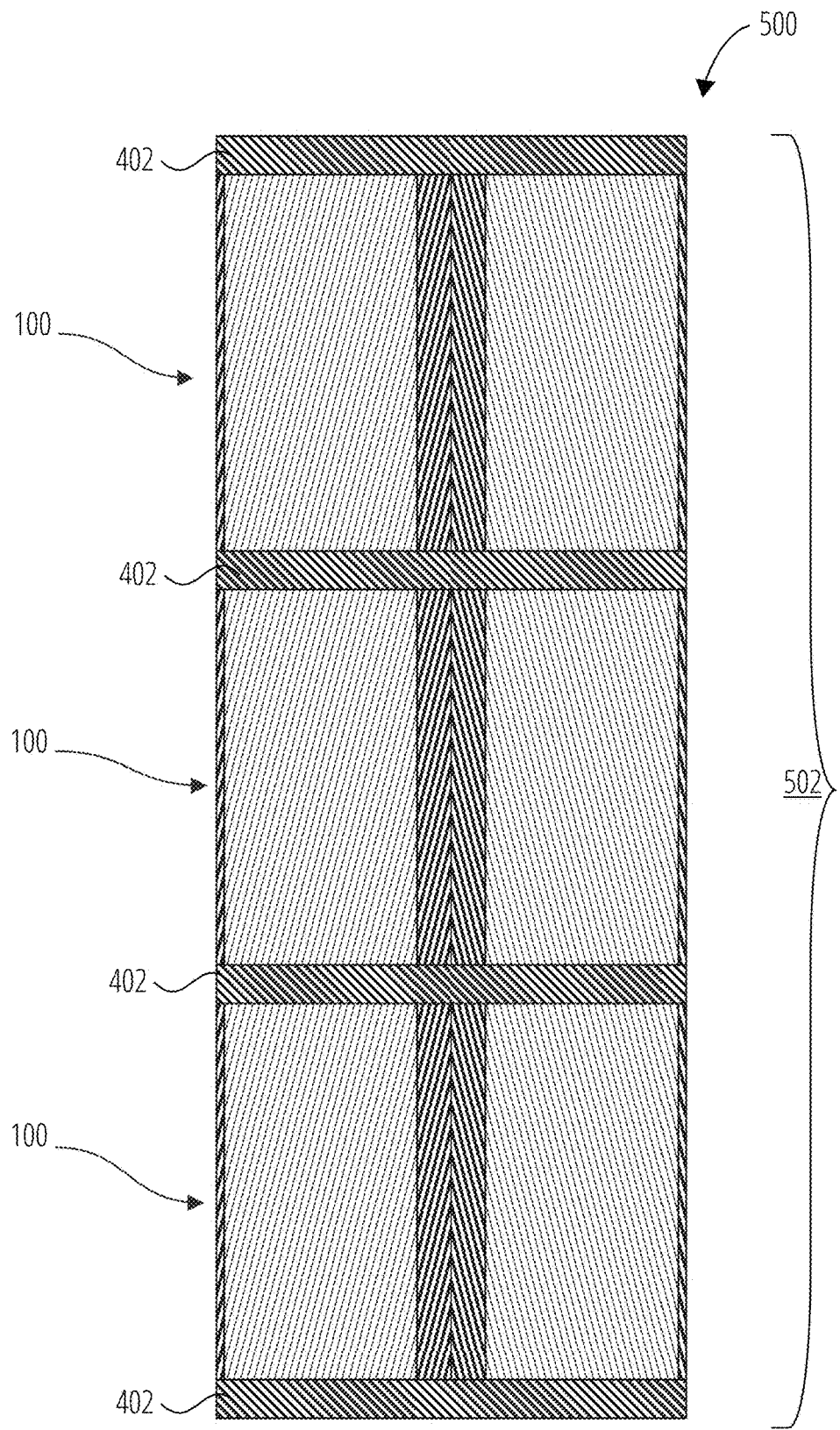
FIG. 5 is an elevational, cross-sectional illustration of a fuel pellet arrangement, according to embodiments of the disclosure, wherein the arrangement includes a plurality of the fuel pellet of FIG. 1 stacked on one another with the thermally-conductive discs of FIG. 4 interleaved therebetween, wherein the cross-sectional view of each of the fuel pellets is taken along line A-A of FIG. 2.

FIG. 5 illustrates, in elevational cross-section, a fuel pellet arrangement 500 with a stack 502 of a plurality of the fuel pellet 100 of FIG. 1 interleaved with the discs 402 of FIG. 4.

Figure 6:
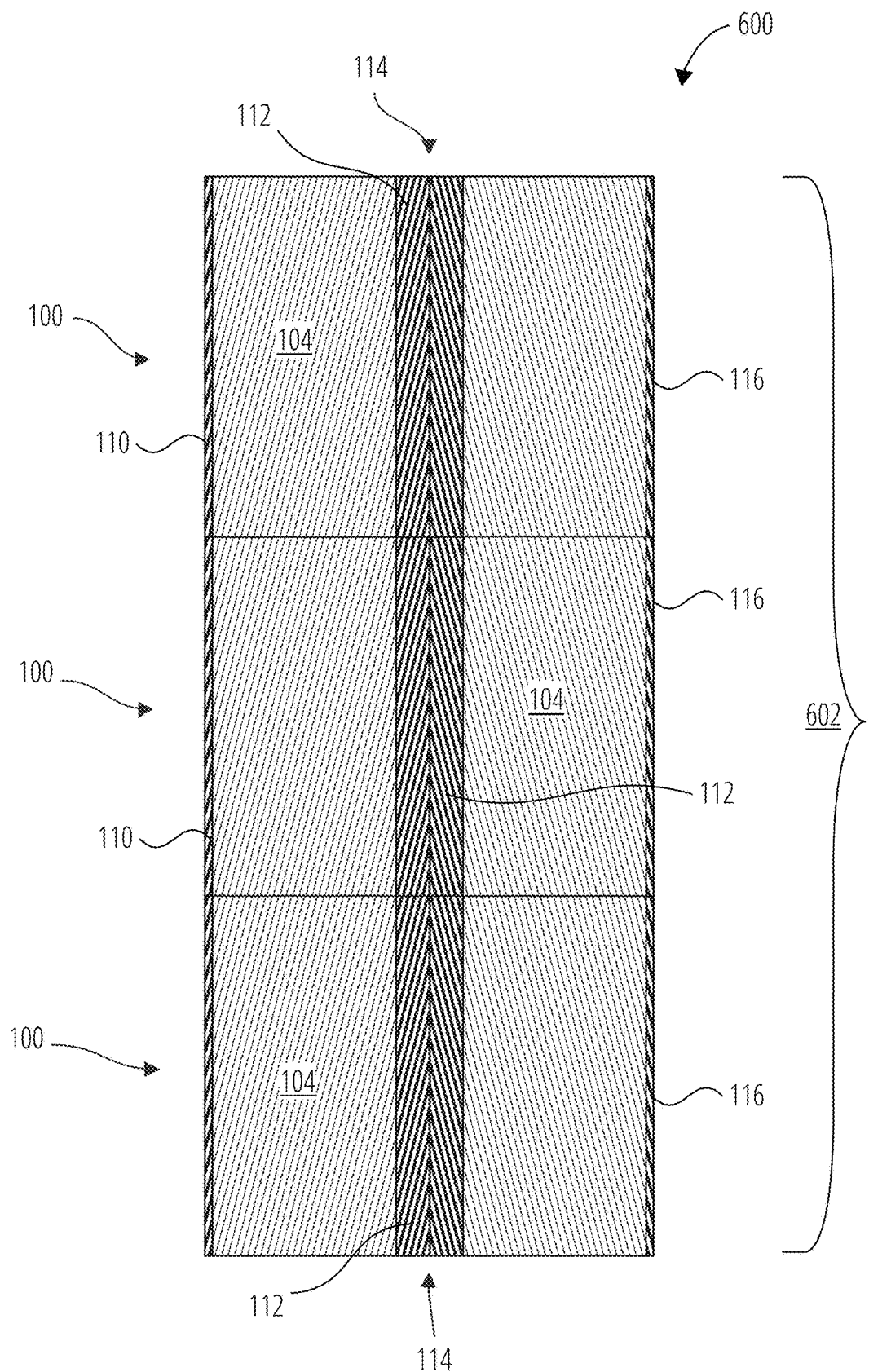
FIG. 6 is an elevational, cross-sectional illustration of a fuel pellet arrangement, according to embodiments of the disclosure, wherein the arrangement includes a plurality of the fuel pellet of FIG. 1 stacked directly on one another, wherein the cross-sectional view of each of the fuel pellets is taken along line A-A of FIG. 2.

FIG. 6 illustrates, in elevational cross-section, a fuel pellet arrangement 600 with a stack 602 of a plurality of the fuel pellet 100 of FIG. 1, wherein each fuel pellet 100 is stacked directly on a neighboring other fuel pellet 100 of the stack 602.

Notably, relative to the fuel pellet arrangement 500 of FIG. 5, the fuel pellet arrangement 600 of FIG. 6 has a greater volume percentage occupied by the fuel 108 (FIG. 1 through FIG. 3). That is, in the fuel pellet arrangement 500 of FIG. 5, a portion of the total volume of the stack 502 is occupied by the discs 402; whereas, in the fuel pellet arrangement 600 of FIG. 6, no portion of the total volume of the stack 602 is occupied by non-fuel material other than the insert 102 (FIG. 1 through FIG. 3) of each respective fuel pellet 100. Thus, the fuel pellet arrangement 600 maximizes the volume percentage of the fuel 108, which may enable an enrichment percentage closest to that of a stack of monolithic fuel structures, while also enabling increased safety in operation due to the improved thermal performance (e.g., including a decreased peak temperature and decreased integrated average temperature) exhibited by the fuel pellet 100 over its whole lifetime.

As illustrated in FIG. 5 and in FIG. 6, each fuel pellet 100 may be arranged, in the stack 502 (FIG. 5), 602 (FIG. 6) so that the fins 104 of each respective fuel pellet 100 align and overlap one another. In other embodiments, each fuel pellet 100 may be arranged, in the stack 502 (FIG. 5), 602 (FIG. 6), so that the fins 104 of each respective fuel pellet 100 are offset from one another.

Figure 7:
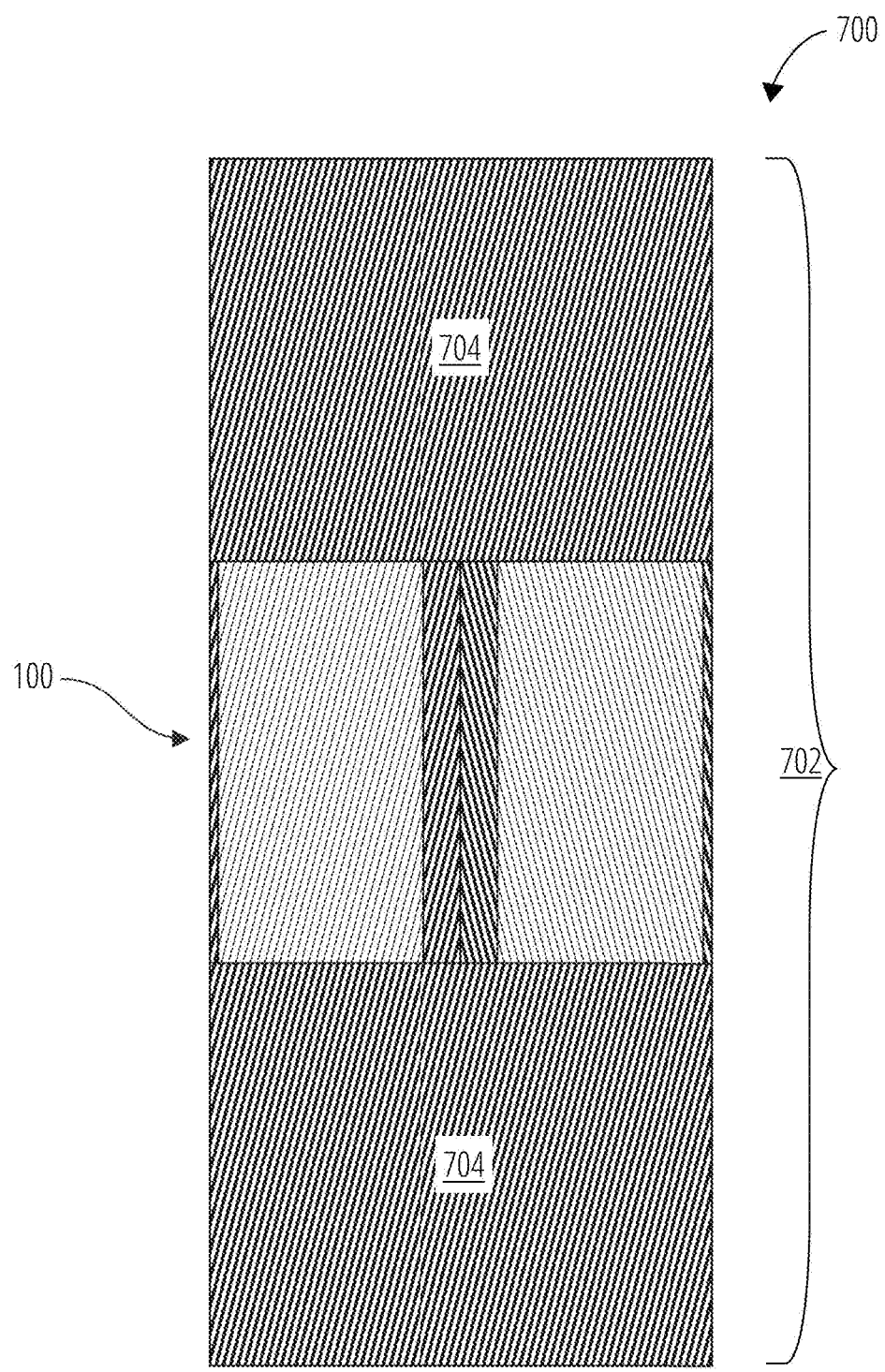
FIG. 7 is an elevational, cross-sectional illustration of a fuel pellet arrangement, wherein the arrangement includes a stack with at least one of the fuel pellets disclosed herein in addition to one or more conventional fuel pellets.

The fuel pellets disclosed herein may also be used in fuel pellet arrangements that include one or more conventional fuel pellets. For example, with reference to FIG. 7, a fuel pellet arrangement 700 may include a stack 702 with at least one fuel pellet of embodiments of this disclosure (e.g., one or more of the fuel pellet 100 of FIG. 1 and/or one or more other fuel pellets disclosed herein) and at least one conventional fuel pellet 704 (e.g., a fuel pellet without a thermally-conductive insert or without a thermally-conductive insert having thin portions of a thermally-conductive material). The at least one fuel pellet of embodiments of this disclosure (e.g., the fuel pellet 100 of FIG. 1) may be disposed between more than one of the conventional fuel pellet 704. In such an arrangement, fuel pellet(s) of embodiments of this disclosure may be disposed in the regions of a reactor reaching the greatest operating temperatures, while the conventional fuel pellet 704 (or pellets 704) may be disposed at regions of generally lower operating temperatures. The fuel pellets of the present disclosure, disposed in the higher-temperature regions may be configured to better handle the higher temperatures, e.g., with improved thermal performance, than if a conventional fuel pellet 704 were disposed in such higher-temperature regions.

The arrangement of the various segments of the thermally-conductive material of the insert may be varied and nonetheless achieve the improved thermal performance over the lifetime of the pellet or pellet arrangement. For example, in embodiments in which the thermally-conductive material of the insert are in the form of fins (e.g., radially-extending fins), the number and disposition of the fins and the structure of any central hub-like structure (e.g., the annular portion 106 of FIG. 1) may be tailored to achieve desired performance characteristics for the fuel.

Figure 8:
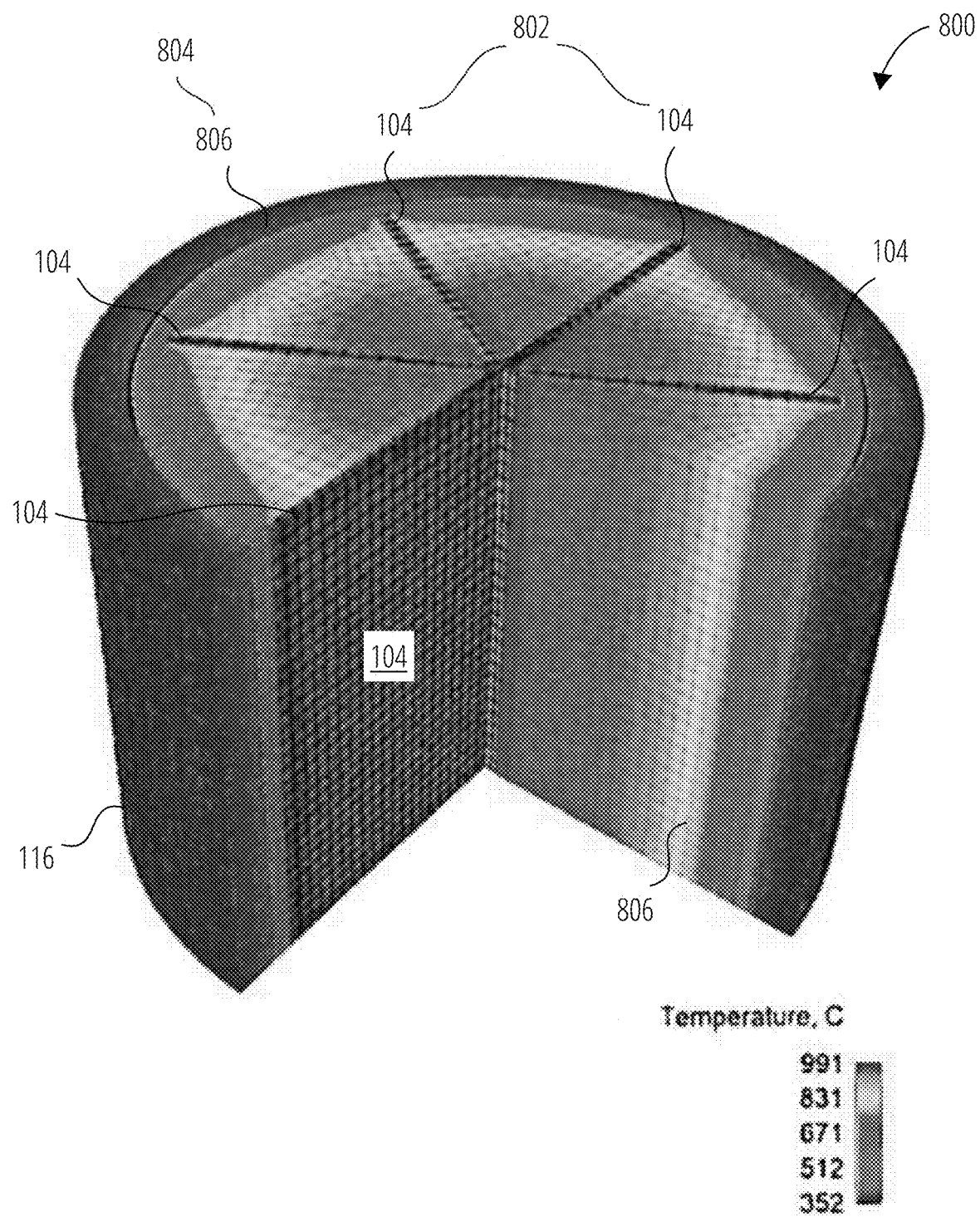
FIG. 8 is a front and top perspective, cross-sectional, temperature contour illustration for a fuel pellet, according to embodiments of the disclosure, wherein the fuel pellet includes a thermally-conductive insert having six fins extending from a central axis of the fuel pellet.

FIG. 8 illustrates a fuel pellet 800 with an alternative configuration of an insert 802. In this fuel pellet 800, the insert 802 includes a plurality of the fins 104 (e.g., six fins 104), but with each of the fins 104 extending from a central axis of the fuel pellet 800. Thus, the structure of the fuel pellet 800 of FIG. 8 has a solid central hub-like structure, rather than a tubular structure as with the annular portion 106 of FIG. 1. Fuel 804 of the insert 802 includes only an outer fuel portion 806. Therefore, the fuel 804 is formed in a unitary whole, without any discrete, separate segments (e.g., such as the central rod 112 of FIG. 1, relative to the outer fuel portion 110 of FIG. 1).

The fuel pellet 800 of FIG. 8 is like the fuel pellet 100 of FIG. 1, but with the width W(A) of the annular portion 106 being zero and with the length L(F) of each of the fins 104 potentially being longer (e.g., if width W(E) is the same) or potentially being the same (e.g., if width W(E) is lesser in FIG. 1 compared to in FIG. 8). Accordingly, as discussed above, the dimensions of the components (e.g., the fins 104 and the annular portion 106, if any) of the insert 102 (FIG. 1) or insert 802 may be optimized according to design needs.

Figure 9:
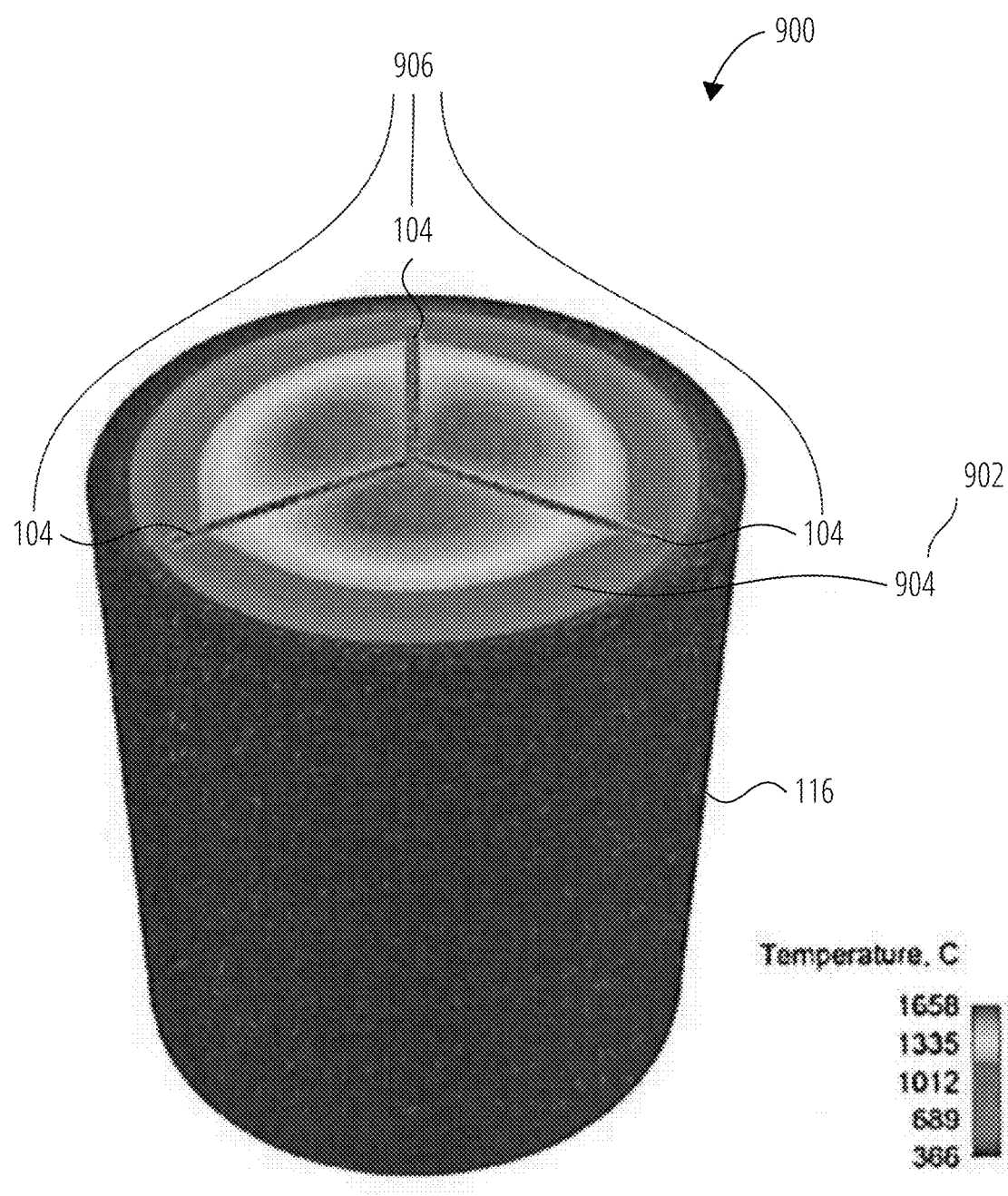
FIG. 9 is a front and top perspective, cross-sectional, temperature contour illustration for a fuel pellet, according to embodiments of the disclosure, wherein the fuel pellet includes a thermally-conductive insert having three fins extending from a central axis of the fuel pellet.

In fin-incorporating embodiments, the number of fins 104 included in the insert of the fuel pellet may also be optimized. For example, FIG. 9 illustrates a fuel pellet 900 that includes an insert 906 with three fins 104. Like the fuel pellet 800 of FIG. 8, the fuel pellet 900 of FIG. 9 includes fuel 902 in the form of only an outer fuel portion 904 (e.g., without a separated, discrete central rod 112 as in FIG. 1).

The number of fins 104 included in the fuel pellets of the disclosure may therefore be optimized according to design needs.

Figure 10:
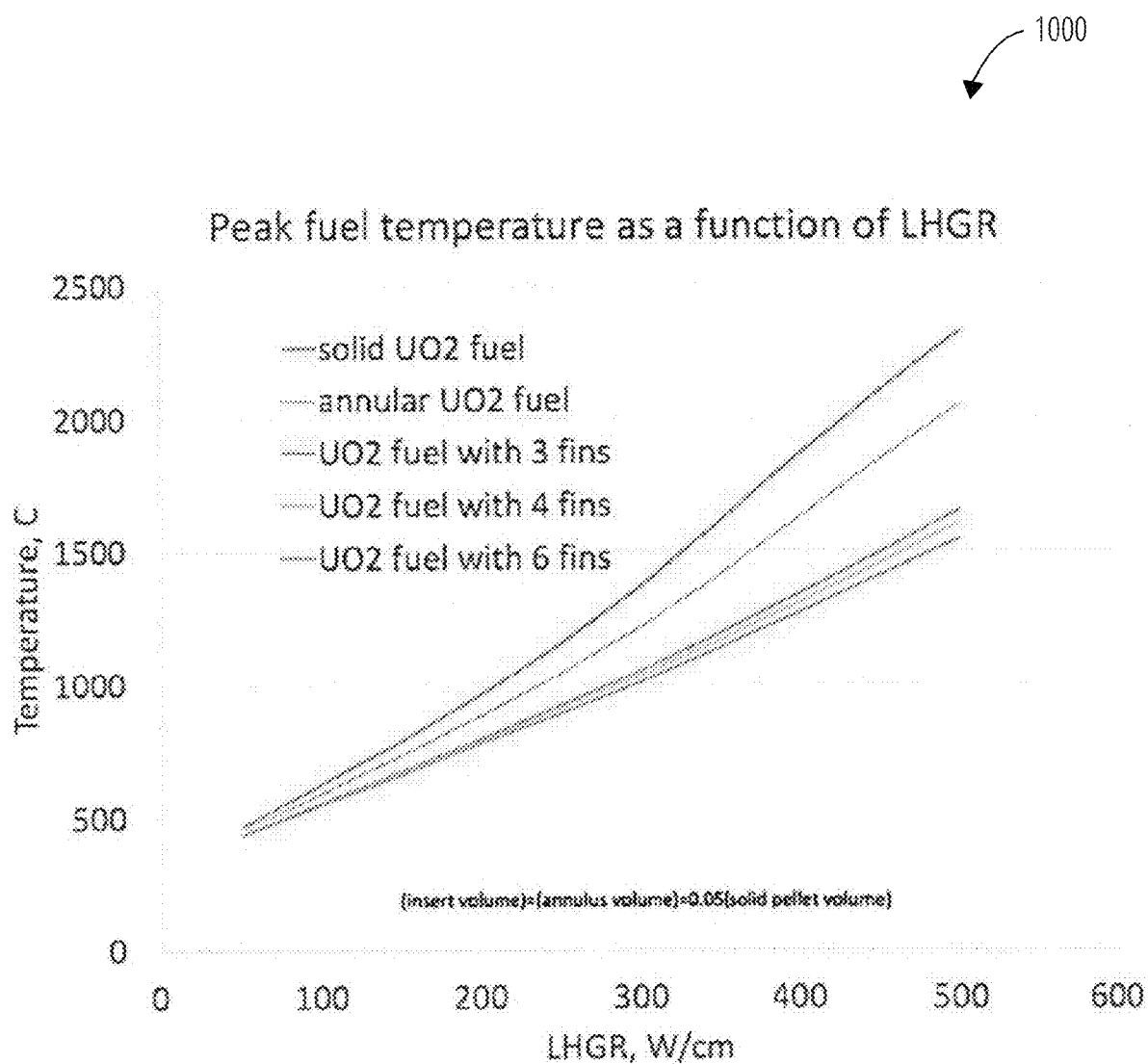
FIG. 10 is a chart comparing the peak fuel temperature as a function of linear heat generation rate (LHGR) for various embodiments of fuel pellets, including those according to embodiments of the disclosure and those of conventional art.

FIG. 10 is a chart 1000 of the peak temperature of fuel pellets in various configurations, as a function of linear heat generation rate (LHGR). The indicated "UO2 fuel with 6 fins" refers to a pellet with the structure of the fuel pellet 800 of FIG. 8 (e.g., without an annular portion to the insert 802), wherein the fuel 804 is UO2. The indicated "UO2 fuel with 4 fins" refers to a pellet a structure similar to that of the fuel pellet 800 of FIG. 8 or the fuel pellet 900 of FIG. 9, but with the number of fins 104 being four. The indicated "UO2 fuel with 3 fins" refers to a pellet with the structure of the fuel pellet 900 of FIG. 9. The indicated "annular UO2 fuel" refers to the above-referenced conventional pellet in which the fuel has an annular structure with a hollow central portion. The indicated "solid UO2 fuel" refers to the above-referenced conventional pellet in which the fuel has a monolithic cylindrical structure.

As indicated by the chart 1000 of FIG. 10, the fuel pellets with fins 104 exhibit markedly lower peak temperatures, particularly at greater linear heat generation rates (LHGR).

Figure 11A:
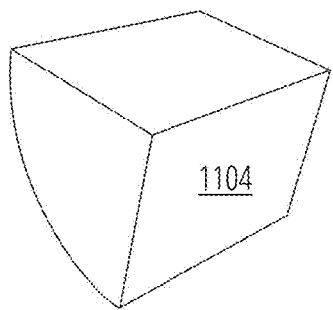

Notably, the thermally-conductive inserts of the fuel pellets and fuel pellet arrangements of embodiments of this disclosure may be alternatively configured, either with or without use of discs (e.g., discs 402), to enable improved thermal performance over the lifetime of the fuel. For example, FIG. 11A through FIG. 11H illustrate various fuel pellet configurations, each shown as one quarter (¼th) of a full fuel pellet structure, for ease of illustration:

FIG. 11A illustrates a conventional fuel pellet 1102 with a monolithic, solid cylindrical structure consisting of fuel 1104, without a thermally-conductive insert and without thermally-conductive discs.

Figure 11B:
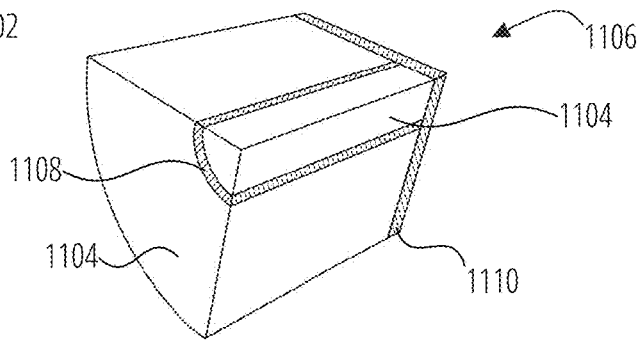

FIG. 11B illustrates a fuel pellet 1106 with an insert 1108, of thermally-conductive material(s), having an annular portion laterally surrounded by and filled with the fuel 1104. The fuel pellet 1106 also includes discs 1110 (of thermally-conductive material(s) (e.g., like the discs 402 of FIG. 4)), though only one of the discs 1110 is illustrated in FIG. 11B, for ease of illustration.

Figure 11C:
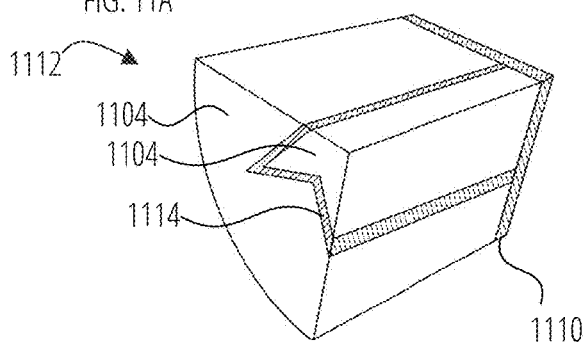

FIG. 11C illustrates a fuel pellet 1112 with an insert 1114, of thermally-conductive material(s), having a star-shaped tubular portion laterally surrounded by and filled with the fuel 1104. The fuel pellet 1112 also includes discs 1110, though only one of the discs 1110 is illustrated in FIG. 11C, for ease of illustration.

Figure 11D:
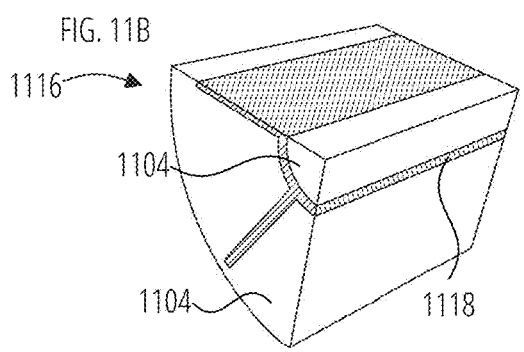

FIG. 11D illustrates a fuel pellet 1116 with an insert 1118, of thermally-conductive material(s), having fins extending from an annular portion that is filled with the fuel 1104. The fuel 1104 also laterally surrounds the fins and the annular portion. No discs are included in the fuel pellet 1116 of FIG. 11D.

Figure 11E:
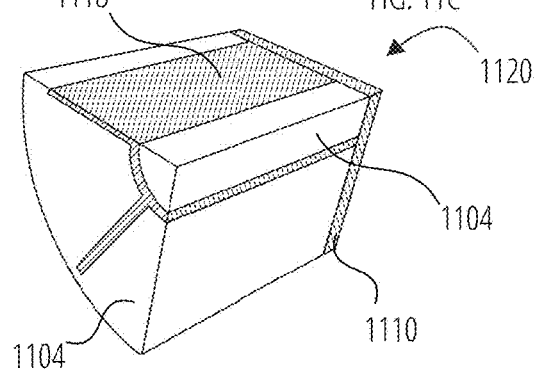

FIG. 11E illustrates a fuel pellet 1120 that includes the insert 1118 and the fuel 1104 of FIG. 11D, but also includes discs 1110, though only one of the discs 1110 is illustrated in FIG. 11E, for ease of illustration.

Figure 11F:
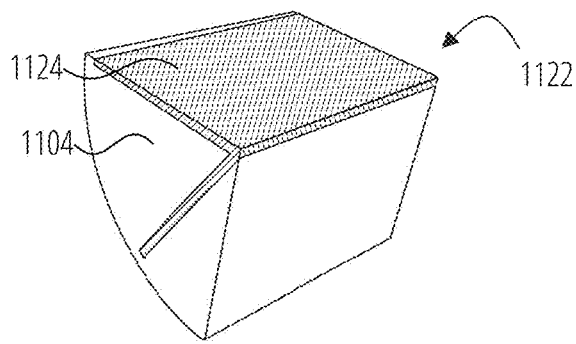

FIG. 11F illustrates a fuel pellet 1122 (e.g., like the fuel pellet 800 of FIG. 8) that includes an insert 1124, of thermally-conductive material(s), consisting of fins extending directly from a longitudinal axis of the fuel pellet 1122. The fuel 1104 laterally surrounds the fins. No discs are included in the fuel pellet 1122.

Figure 11G:
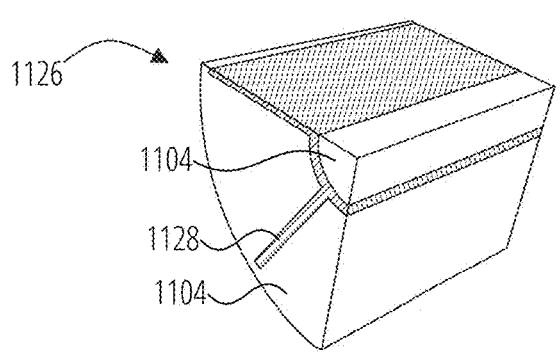

FIG. 11G illustrates a fuel pellet 1126 (e.g., like the fuel pellet 100 of FIG. 1) with an insert 1128, of thermally-conductive material(s), having long fins extending from an annular portion that is filled with the fuel 1104. The fuel 1104 also laterally surrounds the fins and the annular portion. No discs are included in the fuel pellet 1126.

Figure 11H:
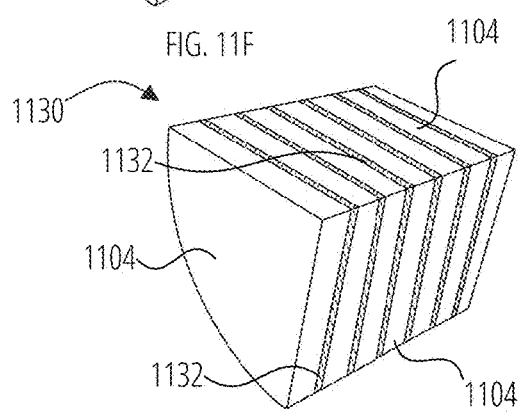

FIG. 11H illustrates a fuel pellet 1130 with an insert 1132, of thermally-conductive material(s), having multiple discrete portions in the form of fins that extend perpendicularly relative to a central axis of the fuel pellet 1130. In other words, the fins extend radially and continuously throughout 360 degrees of the cross-section of the fuel pellet 1130. The fuel 1104 is interleaved with the fins of the insert 1132, providing a sandwich-like structure with the thermally-conductive material of the insert 1132 alternating with the fuel 1104. The number and spacing of the fins of the insert 1132, relative to one another within the fuel pellet 1130, may be tailored according to design needs. Accordingly, while the fins of the inserts of the fuel pellets of FIG. 1, FIG. 8, FIG. 9, and FIG. 11D through FIG. 11G are planar, rectangular, and vertically oriented (relative to a central axis of the fuel pellet being also vertically oriented), in other embodiments, such as that of FIG. 11H, the fins of the inserts of the fuel pellets may be planar, ovular (e.g., circular), and horizontally oriented (relative to the central axis of the fuel pellet being vertically oriented). The thickness of each layer of the fuel 1104 and each of the fins of the insert 1132 may also be tailored according to design needs.

In still other embodiments, the inserts may include both vertically-oriented and horizontally-oriented portions, may include portions oriented at non-vertical and non-horizontal angle, may include non-planar portions other than only annular or rod-like portions, etc. Nonetheless, the insert (e.g., the total volume of all portions of the insert) may occupy up to about 10 vol. % of the pellet with the remaining portion occupied substantially by the fuel. And, in such embodiments, the fins (e.g., vertically oriented, horizontally oriented, or otherwise oriented) or the walls defining other portions of the insert (e.g., the wall of annular portions, otherwise-tube-like portions, etc.) may each define a thickness of about 0.5 mm or less.

Following is a table showing measured peak temperatures in the various fuel pellets of FIG. 11A through FIG. 11H, wherein the fuel 1104 is $UO_2$ and, for the fuel pellet 1130 of FIG. 11H, each layer of the fuel 1104 defines a thickness of 100 mm and each horizontally-oriented fin defines a thickness of 0.050 mm:

| STRUCTURE OF FUEL PELLET (AND OF THE FUEL ARRANGEMENT) | PEAK TEMPERATURE |
| --- | --- |
| The conventional fuel pellet 1102 of FIG. 11A | 1950° C. |
| The fuel pellet 1106 of FIG. 11B | 1825° C. |
| The fuel pellet 1112 of FIG. 11C | 1626° C. |
| The fuel pellet 1116 of FIG. 11D | 1347° C. |
| The fuel pellet 1120 of FIG. 11E | 1308° C. |
| The fuel pellet 1122 of FIG. 11F | 1218° C. |
| The fuel pellet 1126 of FIG. 11G | 1137° C. |
| The fuel pellet 1130 of FIG. 11H | 1171° C. |

As can be seen from the above table, including a thermally-conductive insert in a fuel pellet significantly lowers the peak temperature during use of the fuel pellet, even without use of additional thermally-conductive structures, such as discs, though such additional thermally-conductive structures may also be included.

In any of the aforementioned embodiments, the inserts may further include cladding or coated cladding to further protect the thermally-conductive material of the inserts, as is known in the art and so not described in detail herein.

The fuel pellet 100 of FIG. 1, the fuel pellet 800 of FIG. 8, and the fuel pellet 900 of FIG. 9, the fuel pellet 1106 of FIG. 11B, the fuel pellet 1112 of FIG. 11C, the fuel pellet 1116 of FIG. 11D, the fuel pellet 1120 of FIG. 11E, the fuel pellet 1122 of FIG. 11F, the fuel pellet 1126 of FIG. 11G, and the fuel pellet 1130 of FIG. 11H each include an insert that is centrosymmetric about the longitudinal axis of the pellet.

Figure 12:
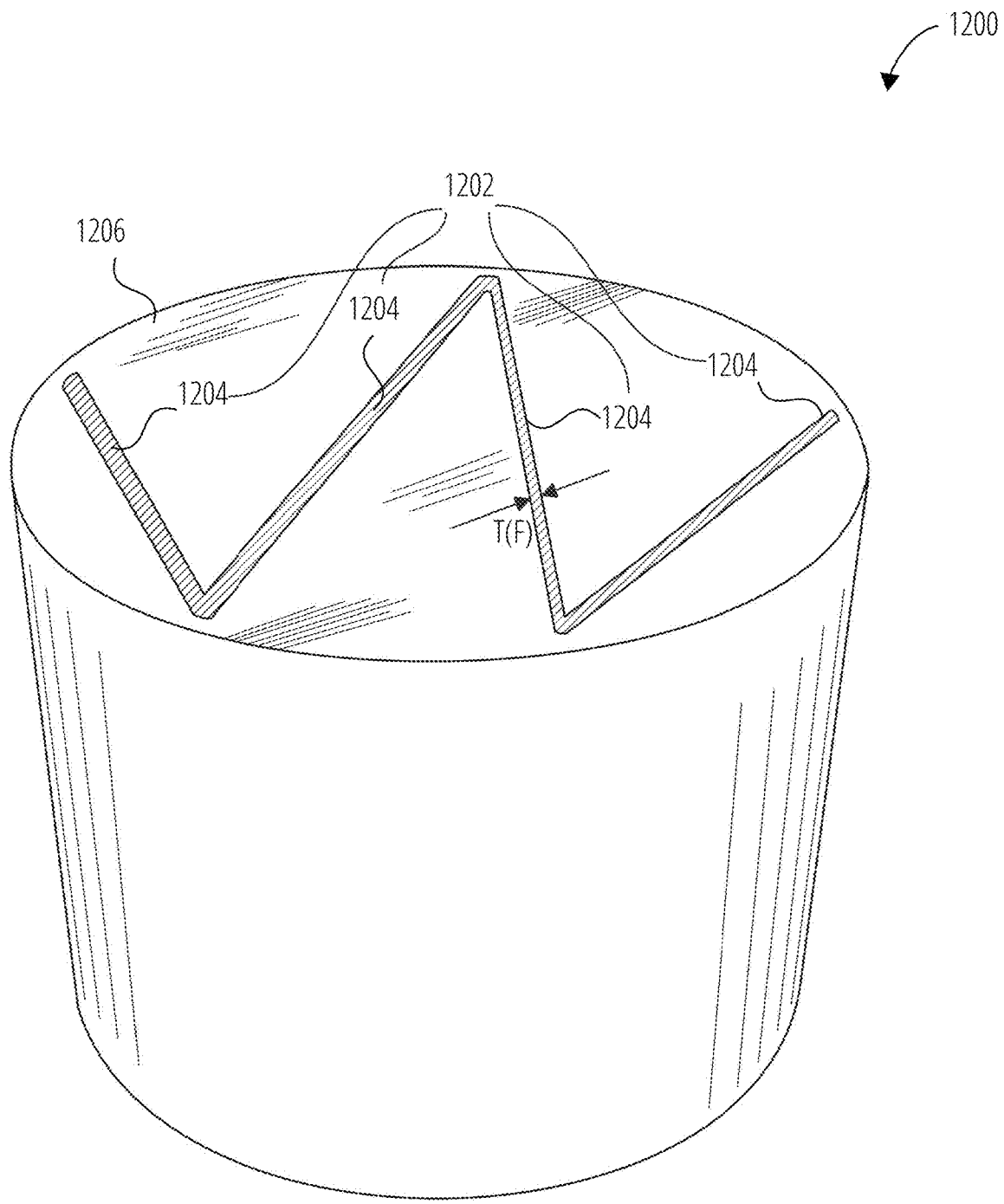
FIG. 12 is a front and top perspective illustration of a fuel pellet, according to embodiments of the disclosure, wherein the fuel pellet includes a non-centrosymmetric, thermally-conductive insert having multiple panel portions in a "W" configuration.

In other embodiments, however, the insert of the fuel pellet may be non-centrosymmetric. For example, FIG. 12 illustrates a fuel pellet 1200 with an insert 1202 having a plurality of panel portions 1204 arranged in a "W" shape. Each of the panel portions 1204 may be relatively thin, e.g., with the thickness T(F) discussed above with regard to FIG. 1. In other embodiments, the one or more portions of the insert may be differently arranged but still extend through a fuel 1206 to improve the thermal performance of the fuel 1206 of the fuel pellet 1200.

Figure 13:
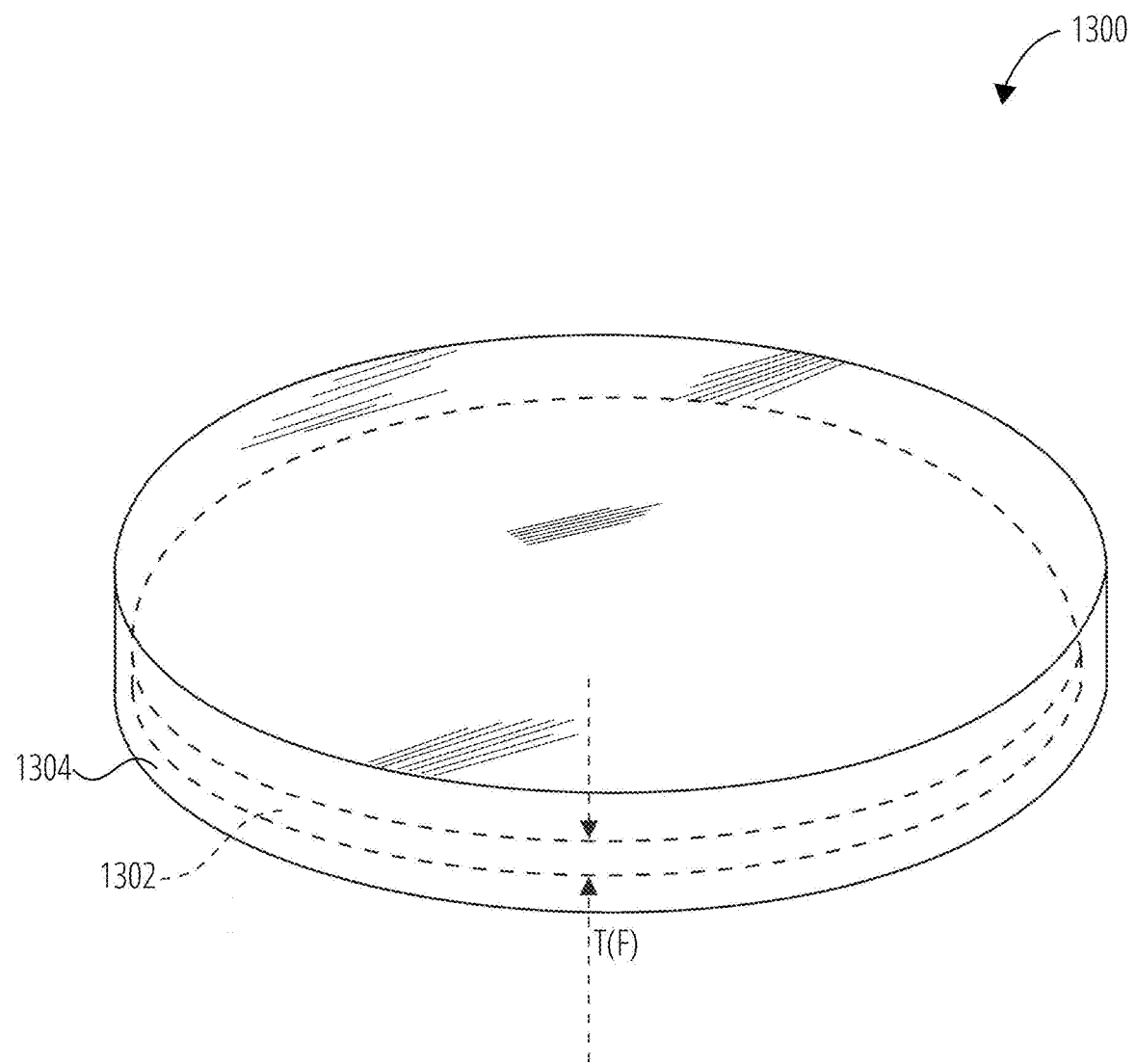
FIG. 13 is a front and top perspective illustration of a fuel pellet, according to embodiments of the disclosure, wherein the fuel pellet is a plate-like fuel pellet that is substantially disc shaped and includes a single disc-shaped, thermally-conductive insert.

The thermally-conductive inserts of the present disclosure may also be beneficial if used with other configurations of fuel pellets, such as plate-type fuel pellets, like that illustrated in FIG. 13. Such a fuel pellet 1300 may be shaped substantially like a disc, with a circular or oval upper and lower surface and a short, cylindrical sidewall. An insert 1302 of a thermally-conductive material may also be substantially-disc shaped, with a relatively thin portion of the thermally-conductive material (e.g., such as with the thickness T(F) discussed above with regard to FIG. 1). The insert 1302 may be fully surrounded by fuel 1304. The presence of the insert 1302 may enable the fuel 1304 to exhibit improved thermal performance throughout its whole lifetime, including, e.g., lower peak temperatures and lower integrated average temperatures.

Fuel pellets and fuel pellet arrangements of the present disclosure are not limited to fuel pellets having substantially cylindrical shapes, such as that of the fuel pellet 100 of FIG. 1, the fuel pellet 800 of FIG. 8, the fuel pellet 900 of FIG. 9, the fuel pellet 1106 of FIG. 11B, the fuel pellet 1112 of FIG. 11C, the fuel pellet 1116 of FIG. 11D, the fuel pellet 1120 of FIG. 11E, the fuel pellet 1122 of FIG. 11F, the fuel pellet 1126 of FIG. 11G, the fuel pellet 1130 of FIG. 11H, the fuel pellet 1200 of FIG. 12, and the fuel pellet 1300 of FIG. 13. The fuel pellets may be alternatively shaped yet still include a thermally-conductive insert that enables the improved thermal performance of the fuel throughout its lifetime, as discussed herein.

Figure 14:
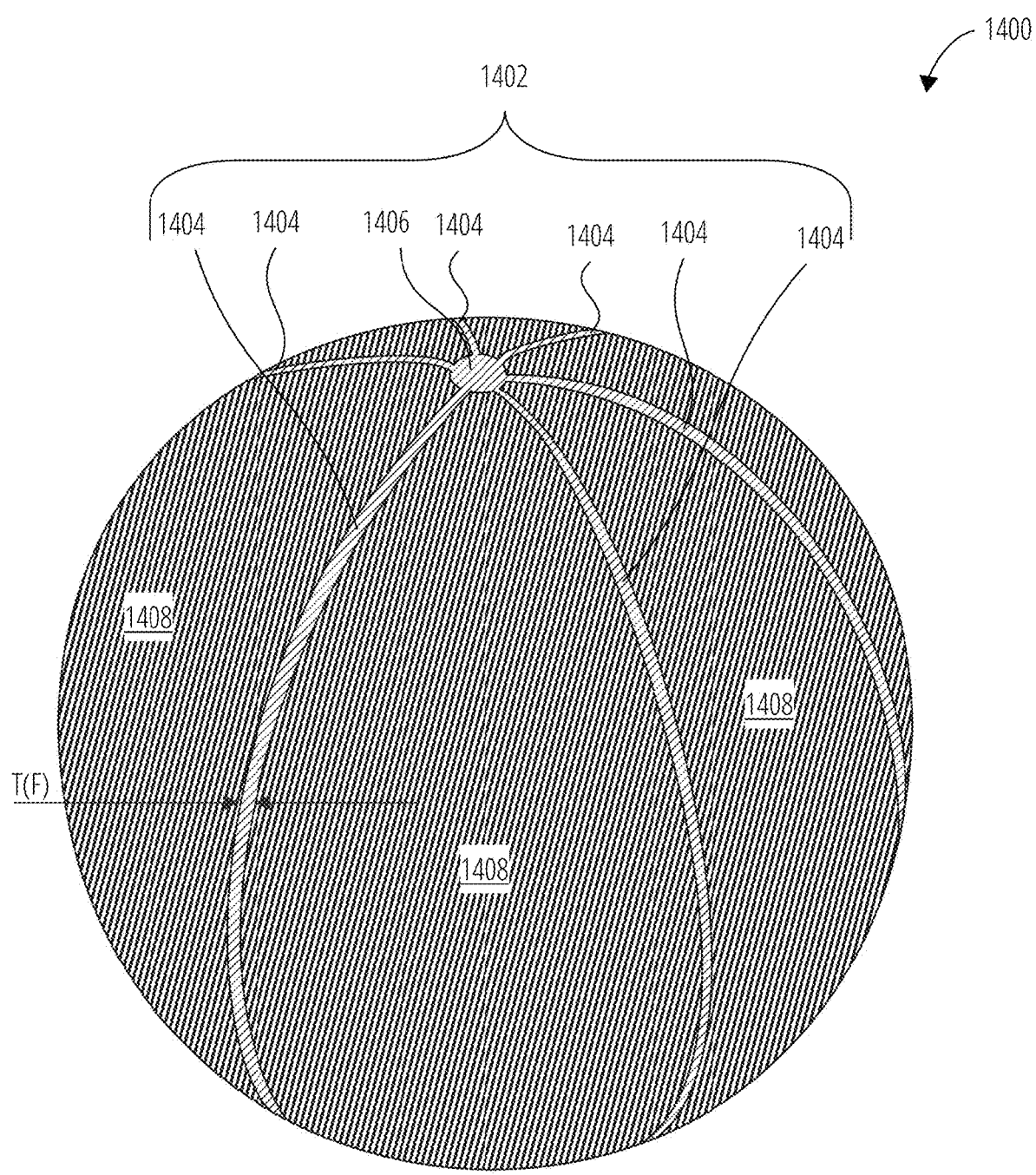
FIG. 14 is a front and top perspective illustration of a fuel pellet, according to embodiments of the disclosure, wherein the fuel pellet is a sphere-like fuel pellet that has a substantially spherical shape and includes a thermally-conductive insert.

For example, FIG. 14 illustrates a fuel pellet 1400 having a substantially spherical shape. The fuel pellet 1400 includes an insert 1402 comprising multiple portions of a thermally-conductive material, such as multiple fins 1404 extending from a rod portion 1406 extending between a north pole and a south pole of the fuel pellet 1400. Multiple segments of fuel 1408 fill the remainder of the fuel pellet 1400. The inclusion of the insert 1402 may enable improved thermal performance by the fuel 1408 throughout its lifetime.

The particular values and configurations discussed in these non-limiting examples can be varied and are cited merely to illustrate at least one embodiment and are not intended to limit the scope thereof.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A fuel pellet for a reactor, the fuel pellet comprising:
 an insert comprising a thermally-conductive material, the insert configured as at least one solid structure extending within a fuel, each of the at least one solid structure of the insert being structured as:
   a planar structure comprising the thermally-conductive material, the planar structure extending from a central axis of the fuel pellet, along a radius of the fuel pellet, to substantially a periphery of the fuel pellet, or
   a nonplanar structure extending continuously across substantially the whole of the height of the fuel pellet, the nonplanar structure being defined by at least one wall formed of the thermally-conductive material, the fuel filling an interior region at the central axis and defined by the at least one wall,
 the fuel and the thermally-conductive material of the at least one solid structure of the insert providing mutually distinctive regions of the fuel pellet,
 the insert occupying less than about 10 volume percent of the fuel pellet.

2. The fuel pellet of claim 1, wherein the at least one solid structure of the insert comprises a plurality of fins, each of the fins comprising one of the planar structures.

3. The fuel pellet of claim 1, wherein the thermally-conductive material exhibits a room-temperature, unirradiated, thermal conductivity greater than 10 W/m-K.

4. The fuel pellet of claim 1, wherein the thermally-conductive material comprises one or more of silicon (Si), zirconium (Zr), aluminum oxide ($Al_2O_3$), niobium (Nb), molybdenum (Mo), chromium (Cr), uranium (U), carbon (C), and iron (Fe).

5. The fuel pellet of claim 1, wherein the fuel comprises one or more of uranium, plutonium, and thorium.

6. The fuel pellet of claim 1, wherein the fuel occupies at least 90 volume percent of the fuel pellet.

7. The fuel pellet of claim 1, wherein:
 the insert is configured as a singular structure comprising the at least one solid structure; and
 at least one of the at least one solid structure of the insert is structured as the planar structure.

8. The fuel pellet of claim 1, wherein the fuel comprises discrete segments separated from one another by the insert.

9. The fuel pellet of claim 1, wherein:
 the at least one solid structure of the insert comprises the nonplanar structure, the nonplanar structure being further structured as an annular portion provided by the at least one wall; and
 further comprising a plurality of fins extending radially from the annular portion.

10. The fuel pellet of claim 3, wherein:
 a first discrete segment of the fuel fills the annular portion of the insert in the interior region at the central axis and defined by the at least one wall; and
 a second discrete segment of the fuel horizontally surrounds the fins.

11. The fuel pellet of claim 2, wherein the fuel pellet comprises three or six of the fins.

12. A fuel pellet for a reactor, the fuel pellet comprising:
 an insert comprising a thermally-conductive material, the insert configured as at least one solid structure extending within a fuel, each of the at least one solid structure of the insert being structured as:
   a planar structure comprising the thermally-conductive material and extending continuously across substantially a whole of at least one of a height and a width of the fuel pellet, or
   a nonplanar structure extending continuously across substantially the whole of the height of the fuel pellet, the nonplanar structure being defined by at least one wall formed of the thermally-conductive material, the fuel filling a region defined by the at least one wall,
 the fuel and the thermally-conductive material of the at least one solid structure of the insert providing mutually distinctive regions of the fuel pellet, wherein the insert is non-centrosymmetrically arranged within the fuel pellet, and the insert occupying less than about 10 volume percent of the fuel pellet.

13. A fuel pellet arrangement comprising a stack of fuel pellets, at least one of the fuel pellets comprising:
    a thermally-conductive insert within a fuel, the thermally-conductive insert and the fuel providing mutually distinctive regions of the at least one of the fuel pellets,
    the thermally-conductive insert configured as at least one solid structure defined by at least one wall of a thickness of less than about 0.5 mm, each of the at least one wall configured as either:
        a planar wall extending horizontally or vertically through the fuel, from a central axis of the at least one of the fuel pellets, along a radius of the at least one of the fuel pellets, to substantially a periphery of the fuel pellet; or
        a nonplanar wall horizontally surrounding a discrete segment of the fuel filling an interior region of the nonplanar wall at the central axis, the nonplanar wall being horizontally surrounded by at least one additional discrete segment of the fuel,
    the thermally-conductive insert occupying less than about 10 volume percent of the at least one of the fuel pellets.

14. The fuel pellet arrangement of claim 13, wherein the fuel pellets of the stack are directly adjacent one another.

15. The fuel pellet arrangement of claim 13, wherein at least one other of the fuel pellets of the stack do not comprise the thermally-conductive insert.

16. The fuel pellet arrangement of claim 13, further comprising discs interleaved with the fuel pellets of the stack.

17. The fuel pellet arrangement of claim 16, wherein:
    the thermally-conductive insert comprises a thermally-conductive material; and
    the discs comprise additional thermally-conductive material.

18. The fuel pellet arrangement of claim 17, wherein the thermally-conductive material of the thermally-conductive insert and the additional thermally-conductive material of the discs have a same chemical composition.

19. A fuel pellet for a reactor, the fuel pellet comprising:
    an insert comprising a thermally-conductive material and configured as at least one solid structure extending within a fuel, the at least one solid structure extending continuously across substantially the whole of the height of the fuel pellet,
    the fuel and the thermally-conductive material providing mutually distinctive regions of the fuel pellet,
    the at least one solid structure being defined by at least one wall formed of the thermally-conductive material, the at least one wall providing a tubular portion of the insert wherein:
        a first discrete portion of the fuel fills the tubular portion of the insert in an interior region at a central axis and defined by the at least one wall; and
        a second discrete segment of the fuel horizontally surrounds the insert,
    the insert occupying less than about 10 volume percent of the fuel pellet.

* * * * *

UNITED STATES PATENT AND TRADEMARK OFFICE
CERTIFICATE OF CORRECTION

| | |
|---|---|
| PATENT NO. | : 11,404,177 B2 |
| APPLICATION NO. | : 16/661398 |
| DATED | : August 2, 2022 |
| INVENTOR(S) | : Robert D. Mariani and Pavel G. Medvedev |

It is certified that error appears in the above-identified patent and that said Letters Patent is hereby corrected as shown below:

In the Claims

Claim 10, Column 14, Line 42, change "claim 3" to --claim 9--

Signed and Sealed this
Seventeenth Day of October, 2023

Katherine Kelly Vidal
*Director of the United States Patent and Trademark Office*